April 7, 1970 G. J. GRAM ET AL 3,505,593
METHOD AND APPARATUS FOR TESTING AND ADJUSTING DELAY LINES
BY DIGITAL TECHNIQUES
Filed Jan. 30, 1968 11 Sheets-Sheet 1

Fig. 1a

SET INPUT TERMINAL

CLEAR INPUT TERMINAL

1 OUTPUT TERMINAL

0 OUTPUT TERMINAL

INVENTORS.
GEORGE J. GRAM
JOHN W. LEITCH
BY
James H. Phillips
AGENT

United States Patent Office 3,505,593
Patented Apr. 7, 1970

---

3,505,593
METHOD AND APPARATUS FOR TESTING AND ADJUSTING DELAY LINES BY DIGITAL TECHNIQUES
George J. Gram, Greenbelt, Md., and John W. Leitch, North Syracuse, N.Y., assignors to General Electric Company, a corporation of New York
Filed Jan. 30, 1968, Ser. No. 701,595
Int. Cl. G01r 27/28; G06f 15/34; H04b 3/04
U.S. Cl. 324—57
10 Claims

ABSTRACT OF THE DISCLOSURE

In order to test and adjust a sonic delay line unit utilized for the storage of digital information and to achieve optimum reliability, method and apparatus for effecting coarse and critically fine delay line unit functional length adjustments are disclosed. A coarse adjustment test is made by introducing a periodic test pulse into the delay line unit and varying the delay line unit length to observe a range of coincidence between the test pulse as read from the delay line unit and a precisely timed reference pulse representing the nominal delay to which the delay line unit is to be adjusted. The actual coarse adjustment comprises setting the delay line unit length intermediate the extremes of concidence.

To effect the fine adjustment test, first and second pattern generators are used. A pseudo-random train of 1 and 0-bits issuing from the first pattern generator is introduced into the delay line with the first 1-bit read from the delay line utilized to start the second pattern generator which commences to issue a train of 1 and 0-bits in the same pseudo-random pattern. A delay line unit output strobe is then relatively shifted near to the trailing edges of the 1 and 0-bits read from the delay line unit and then incrementally further unil a "no compare" condition is observed with respect to the 1 and 0-bits read from the second pattern generator. The delay line unit output strobe is then relatively shifted near to the leading edges of the 1 and 0-bits read from the delay line unit and incrementally further until a second "no compare" condition is observed. The fine adjustment test is repeated as the delay unit line length is varied until the "no compare" conditions are observed to occur with the delay line unit output strobe relatively positioned at the same respective increments at the trailing and leading edges of the 1 and 0-bits.

BACKGROUND OF THE INVENTION

This invention relates to the storage of digital information in sonic delay lines and, more particularly, to simplified means for effecting optimum adjustment of and for critically testing sonic delay lines.

In order to function, electronic digital computers and associated equipments comprising a data processing system must include a variety of means to store information temporarily. Information is normally stored in the straight binary number code or in a binary-code representation of alphanumeric characters. That is to say, the information is stored in bit form, a unit of information comprising one or more bits where each bit must be a 1 or a 0. Bits may be statically stored as 1's or 0's in bistable devices. If a given bistable device is in a first one of its two stable states, a 1 may be deemed stored therein; if the bistable device is subsequently caused to assume the second of its two stable states, a 0 is then stored therein. A bit may be stored statically in such devices as the well-known bistable multivibrator (flip-flop), magnetic core, etc.

Bits may also be stored dynamically in a delay device, typically a delay line. The present invention finds application in association with the dynamic storage of information bits in a delay line.

The existence or nonexistence of a pulse traveling through some medium can be used for the storage of a bit of digital information. The length of time that the bit can be stored without recirculation is the time duration required for the pulse to travel from a pulse generating device which introduces the pulse into the delay line to a pulse receiving device which extracts the delayed pulse from the delay line. The utility of a delay line in a digital data processor as a storage medium arises from the possibility of storing many pulses in one delay line through the simple expedient of having the pulses travel closely spaced one behind the other along the line. It will be observed that a dominant factor in determining the bit storage capacity of a delay line is the nominal length of the delay line. However, such length is not necessarily restrictive of the total length of time specific information can be stored because the use of well-known recirculation techniques (whereby delayed pulses extracted by the pulse receiving device are returned to the pulse generating device and reintroduced into the delay line) permit indefinite storage time.

Inasmuch as a large number of pulses will normally be traveling along a delay line simultaneously (albeit time and space separated from one another) and the pulses are all alike, they must be distinguished from one another by their timing as defined by references pulses. Hence, the delay line output signal is examined (sampled or strobed) for a very short inverval of time at each point in time that an information pulse, if any, should be at its maximum level as detected by the pulse receiving device. These points in time are roughly determined from a knowledge of certain effects which bring about a change in waveform from that transmitted to that received.

One broad category of delay lines which is utilized for the temporary storage of digital information is the sonic delay line, so called because an electrical signal representing information to be stored is converted into a mechanical signal by a transmitting transducer and the signal is propagated as acoustic energy along the delay line at a velocity very much slower than electrical energy, thereby affording relatively long delay times. A transducer disposed at the receiving end of the sonic delay line converts the acoustic energy into electrical energy which can be transformed back into a digital signal meaningful within the data processing system circuits.

A widely used sonic delay line is the magnetostrictive delay line. Magnetostriction is the mechanical deformation that occurs in some materials upon application of a magnetic field. Conversely, a mechanical strain applied to a magnetostrictive material will cause a change in the magnetic properties of the material; in particular, if the material is in the region of a magnetic field, the strain of the passing pulse will alter the reluctance of the flux path and will cause the amount of flux passing through the material to be changed. This change in flux can be used to induce a voltage in a surrounding coil which functions as a receiving transducer.

It will be readily perceived that another factor determinative of the capacity of a given delay line is the rate at which digital information can be introduced into the delay line, the rate manifestly affecting the spacing or density of information passing into the delay line. It can be seen that, as the input frequency is increased and the spacing between pulses decreases accordingly, the vagaries in transmission time caused by such factors as temperature variations (which bring about a change in the physical length of the line) and mechanical shocks render an optimum adjustment of the sampling pulse highly important in order that the broadest possible range of disturbing factors can be accommodated without reading false information from the line. The relative time displacement between the output digital data and the sampling pulse (strobe) arising from variations in the delay time of the delay line from such sources as noted above is termed "jitter." Determining the amount of acceptable jitter, as well as positioning the strobe pulse optimally relative to the jitter, are two of the major problems associated with the operation of magnetostrictive and other sonic delay lines.

It has been the custom in the past to adjust and test sonic delay lines by circulating a predetermined digital data pattern through the delay line and checking the output signal with an external source which functions as a standard. Typically, the positioning of the output data from the delay line relative to the strobe pulse is accomplished visually with an oscilloscope connected to the apparatus such that the time position relationship between the data pulses and strobe pulse is a true representation of that actually existing. Subsequently, the delay line is varied in length to move the received data pulses in time, relative to the strobe pulse, plus or minus some predetermined acceptable amount. Within this range, the narrow strobe pulse and a wider test data bit under observation should be coincident so that no loss of data occurs. In order to check for valid data, commercial counters, parallel delay lines, and other equipment are required. Hence, this general method, known as the worst case test, is open to the objections that relatively expensive test equipment is required if accurate results are to be obtained; further the method is both tedious and time consuming.

Inasmuch as the delay line length must be periodically checked and perhaps readjusted to assure the validity of the retrieved data and the optimum adjustment must be made with a high degree of exactness, it becomes highly desirable to provide a means for effecting the delay line length adjustment in a simpler and less time consuming manner while maintaining the accuracy of adjustment which must be preserved.

SUMMARY OF THE INVENTION

It is therefore a general object of this invention to provide improved means for optimally adjusting the nominal length of a sonic delay line unit.

It is a more specific object of this invention to provide a simplified process for optimally adjusting the utilized length of a sonic delay line unit and apparatus for realizing the process.

It is another specific object of this invention to provide apparatus for testing and adjusting a sonic delay line unit, which test apparatus is adapted for diagnostic use with data processing apparatus of which the acoustic delay line is a constituent.

These and other objects of the invention are achieved, according to one embodiment of the invention, by providing a coarse adjustment to roughly align a test 1-bit periodically passed through the Delay Line Unit with a standard 1-bit which is precisely timed to occur at the nominal delay time to which the Delay Line Unit is being adjusted, the coarse adjustment being followed by a fine adjustment to optimally position the Delay Line Unit Output Strobe according to indirectly observed "jitter."

In effecting the coarse adjustment test utilizing a preferred embodiment of the invention, a binary counter is advanced by pulses from a stable clock pulse generator such that on each occasion at which all the binary counter digits are 0's, a single pulse is decoded and introduced into the Delay Line Unit. A second pulse is generated each time the binary counter reaches a predetermined count corresponding to the nominal delay to which the Delay Line Unit is being adjusted. The Delay Line Unit receiving transducer is then physically moved along the delay line while the range of coincidence of the delayed first pulse and the generated second pulse is determined by observing a coarse compare indicator lamp. The coarse adjustment per se is made by setting the receiving transducer to the midpoint of the observed range of coincidence.

To effect a fine adjustment test, two identical pseudo-random pattern generators are utilized. Both test pattern generators are cleared initially. The first test pattern generator, driven by clock pulses, is then started, and its output signal, an irregular train of 1's and 0's, is introduced into the Delay Line Unit. The first bit read from the Delay Line Unit, a 1-bit, is utilized to start the second test pattern generator such that the two test pattern generators issue identical pseudo-random test patterns displaced in time by the delay time to which the Delay Line Unit has been previously adjusted. The Delay Line Unit Output Strobe is relatively moved close to the trailing edges of the 1's and 0's and incrementally further until a "no compare" condition is observed between the delayed information and that issuing from the second pattern generator. The Delay Line Unit Output Strobe is subsequently relatively moved close to the leading edges of the 1's and 0's and then incrementally further until a second "no compare" condition is observed. Optimum adjustment is attained by varying the Delay Line Unit length until the "no compare" readings occur with the Delay Line Unit Output Strobe relatively positioned at corresponding increments at both the trailing and leading edges of the delayed 1's and 0's. For borderline conditions, means are provided to give a continual indication of the first "no compare" condition detected in a given relative position of the Delay Line Unit Output Strobe Pulse.

The subject matter of the invention is particularly pointed out and distinctly claimed in the concluding portion of the specification. The invention, however, both as to organization and method of operation may best be understood by reference to the following description taken in connection with the accompanying drawings of which:

LOGIC AND LOGIC COMBINATIONS

In a fundamentally binary data processing system, any given signal representing a single bit of information must always be either true or false or, as it is more commonly expressed, either "one" (1) or "zero" (0). Ordinarily, these states are represented within a data processing system, other than as stored in memory devices, by two discrete voltage levels. For example, a voltage level of nominally five volts positive may correspond to a binary 1 signal, and a voltage level of nominally zero volts to a binary 0. The choice of voltage levels is arbitrary except for the consideration of using specific types of logic circuitry which may be preferred or prescribed. It is not uncommon for the two discrete voltage levels which represent 1 and 0 conditions to be different in different logic areas within a data processing system; that is to say, a system in which 1's and 0's are normally represented by five volts positive and zero volt levels, respectively, may include areas in which conditions require a wider voltage disparity and, a polarity inversion. These areas might have logic voltage levels, for example, of eighteen volts negative for 1's and six volts positive for 0's. For these reasons, it is standard practice to explain binary logic systems in straight forward terms of 1 and 0 conditions without superfluous concern for the precise arbitrary voltages representing these conditions or the circuitry involved.

Temporary storage of a bit of information may be effected by deliberately setting a bistable device to one or the other of its stable states to represent a 1 or a 0. The bistable device most widely used in electronic information processors is the well-known flip-flop. A flip-flop is said to be in either the set state or the clear (or reset) state and has the capability of retaining a state into which it has been placed until it is operated upon and forced into its alternate state. A change of state of a flip-flop is normally brought about by applying a voltage pulse to a "set" or "clear" input. As a practical matter, a flip-flop is usually designed to respond to voltage transients so that a change of state occurs, according to design, on the trailing or leading edge of a voltage pulse applied to a flip-flop input.

The state of the flip-flop may be reflected in one or more outputs, and a flip-flop is usually provided with both 1 and 0 outputs. Should a flip-flop be in the set state, the 1 output will be true and the 0 output will be false. If positive five volts and zero volts represent 1 and 0 signal levels within the local logic area of the system, the 1 output will be positive five volts and the 0 output will be zero volts. On the other hand, if the flip-flop is in the clear state rather than set, the 1 output will be zero volts or false and the 0 output will be positive five volts or true.

Figure 1A:
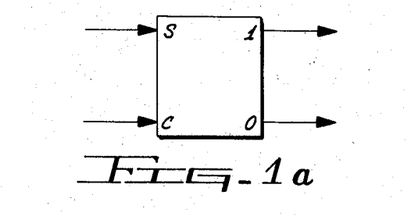
FIGURE 1A is a logic symbol for a flip-flop.
Figure 1B:
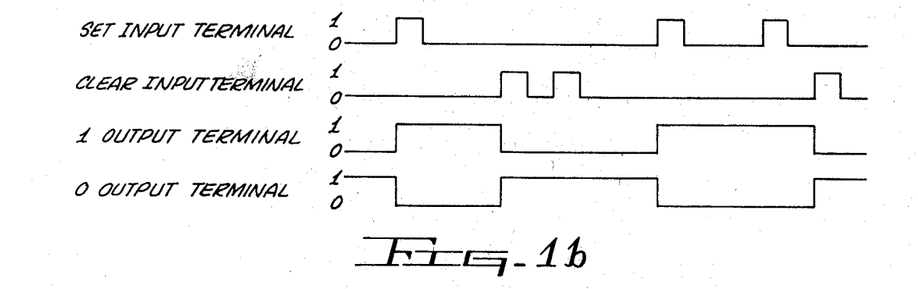
FIGURE 1B is a diagram showing the logical relationships between the input and output signals of the flip-flop of FIGURE 1A.

FIGURE 1A shows a logic symbol for a flip-flop with its set (S) and clear (C) input and 1 and 0 output terminals indicated. FIGURE 1B is a state/time diagram which illustrates the response characteristics of a typical flip-flop to the leading edges of set and clear pulses applied to the appropriate input terminals.

Information requiring a plurality of bits for definition may be temporarily stored in a group of flip-flops which make up a register. Hence, a 24-bit information "word" may be placed in 24-bit register, and the state of each flip-flop in the register may be ascertained by observing the voltage levels at the individual 1 and 0 outputs. The flip-flops of a register may be interconnected to permit serial shifting of the information bits in unison to the next higher order or the next lower order bit position relative to each. Entry of information into a register may be performed serially or in parallel to the individual flip-flops in unison.

The flip-flops of a register may also be interconnected such that the register functions as a counter to accumulate intermittent pulses from one or more pulse sources. Similarly, the flip-flops of a register may be interconnected such that the register functions as a pseudo-random pattern generator which issues 1's and 0's in a serial pattern determined by the interconnection.

Movement of information within electronic digital apparatus is often carried out in relative synchronism. A common time base generator is therefore required; and this conveniently may be a stable oscillator and a suitable wave shaping circuit to produce a train of regular, rectangular pulses often designated the "clock." The 1 and 0 states of a clock pulse train may be time symmetrical or asymmetrical as may be appropriate for the system which it governs.

Figure 2A:
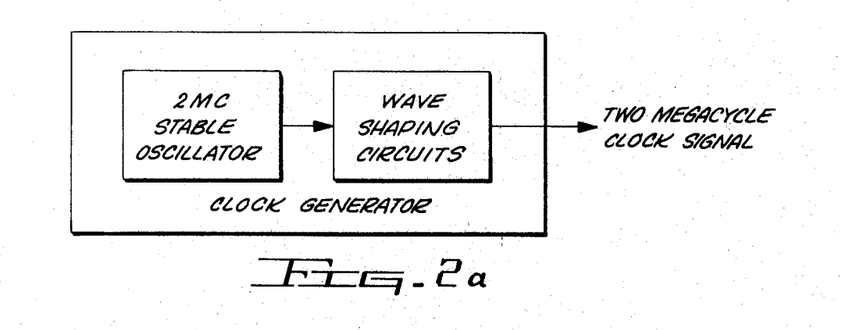
FIGURE 2A is a block diagram of a two megacycle clock generator.
Figure 2B:
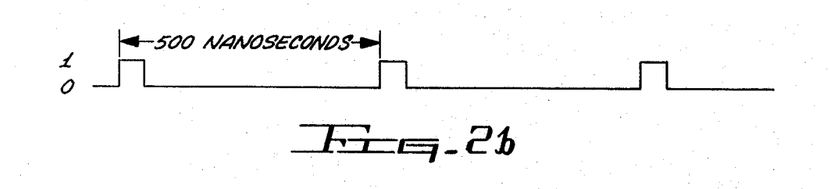
FIGURE 2B is a logic level/time diagram of the output signal from the clock generator of FIGURE 2A.

FIGURE 2A is a block representation of a clock generator, and FIGURE 2B is a diagram showing the time and state dimensions of a two megacycle, asymmetrical clock signal suitable for use in an environment in which the present invention may be practiced.

Generally, two or more output signals from flip-flops and/or other bistable devices such as switches are combined logically, sometimes with and sometimes without a clock or other timing signals, by "gates" to provide input signals to other flip-flops and to provide gating signals which are logically combined with binary information signals to control information movement within the system or device, both as to path and as to relative time.

Figure 3A:
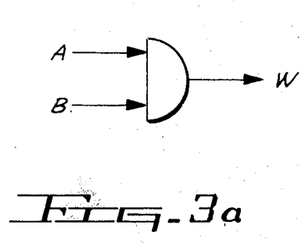
FIGURE 3A is a logic symbol for an AND-gate.
Figure 3B:
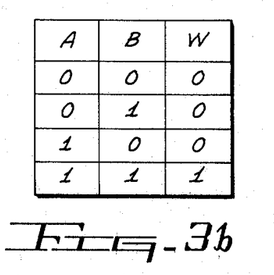
FIGURE 3B is a truth table for the AND-gate of FIGURE 3A.

A gate has a single output which reflects logically the instantaneous states of its inputs. These inputs may, for logical design purposes, be any number required. Widely used gates with certain distinctive characteristics are conventionally designated AND-gates and OR-gates. Gates are represented in logic diagrams by standard symbols according to their characteristics, which characteristics may be summarized in a truth table for each type of gate. For example, a logic notation symbol for a two input AND-gate and its truth table are shown in FIGURES 3A and 3B, respectively. It will be observed that only when the inputs $a$ and $b$ are both 1 will the output $w$ be a 1. If one or more inputs should change to 0, the output $w$ would switch to 0.

Figure 4A:
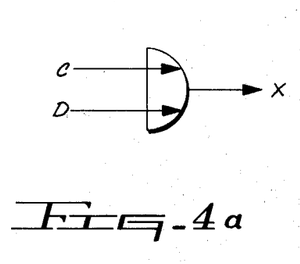
FIGURE 4A is a logic symbol for an OR-gate.
Figure 4B:
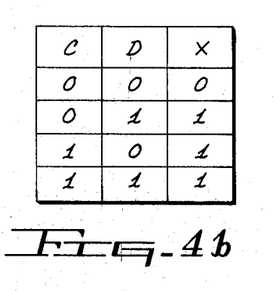
FIGURE 4B is a truth table for the OR-gate of FIGURE 4A.

FIGURE 4A shows a logic notation symbol for a two input OR-gate and FIGURE 4B its truth table. It will be observed that if one or the other or both the inputs $f$ and $g$ is 1 then the gate output $x$ will be 1. If the inputs are all 0, the output $x$ will be 0.

Figure 5A:
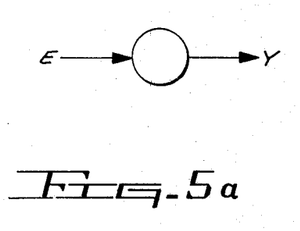
FIGURE 5A is a logic symbol for a logical inverter.
Figure 5B:
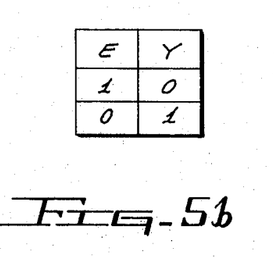
FIGURE 5B is a truth table for the logical inverter of FIGURE 5A.

Another element widely used in binary logic networks is the logical inverter which has a single input and a single output and, as its name implies, inverts a 1 input to a 0 output and a 0 input to a 1 output. A logic notation symbol and truth table for the logical inverter are shown in FIGURES 5A and 5B, respectively.

Figure 6:
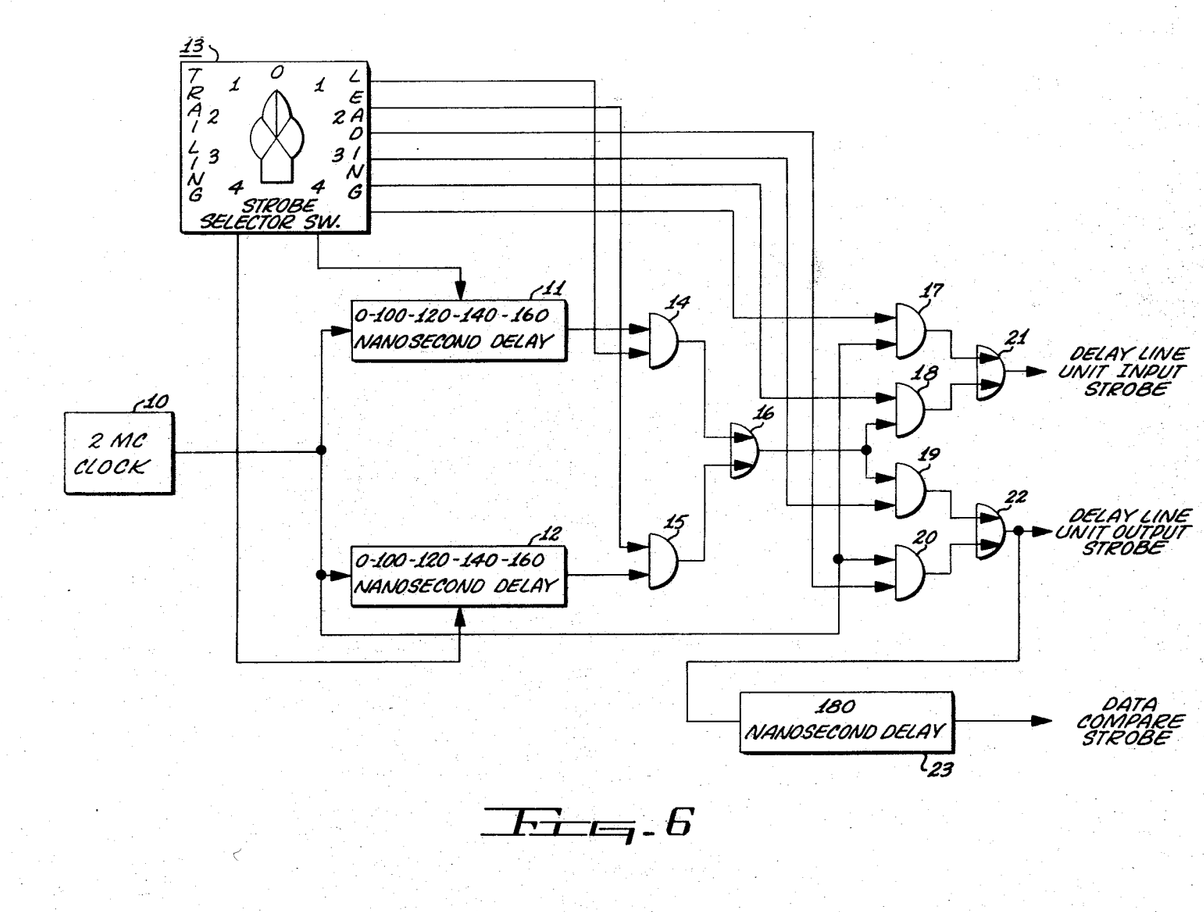
FIGURE 6 is a logical schematic diagram of logic circuits for providing and selectively varying the time relationships of the Delay Line Unit Input Strobe, the Delay Line Unit Output Strobe, and the Data Compare Strobe.
Figure 7:
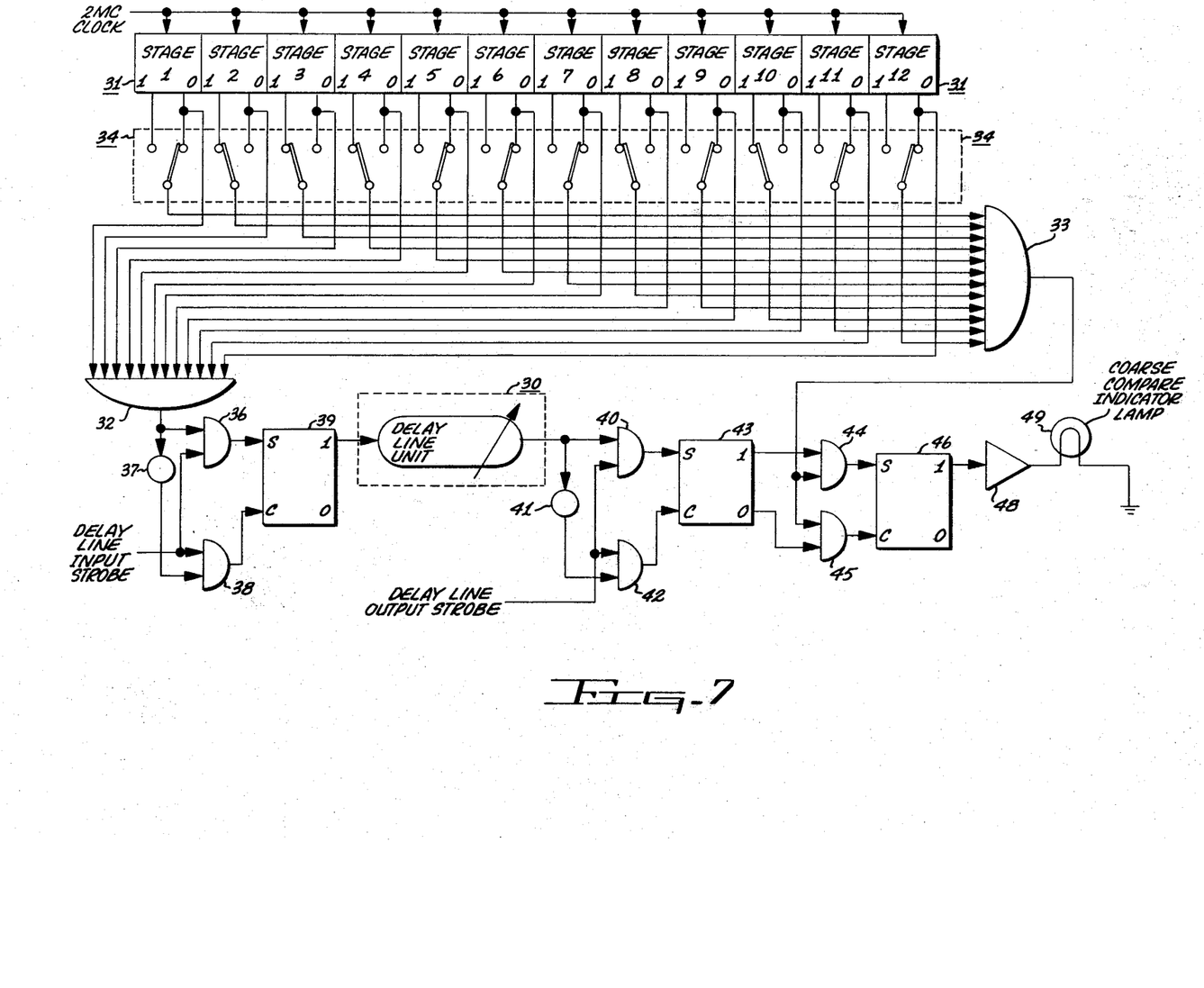
FIGURE 7 is a logical schematic diagram of logic circuits for effecting the Delay Line Unit coarse adjustment.
Figure 9:
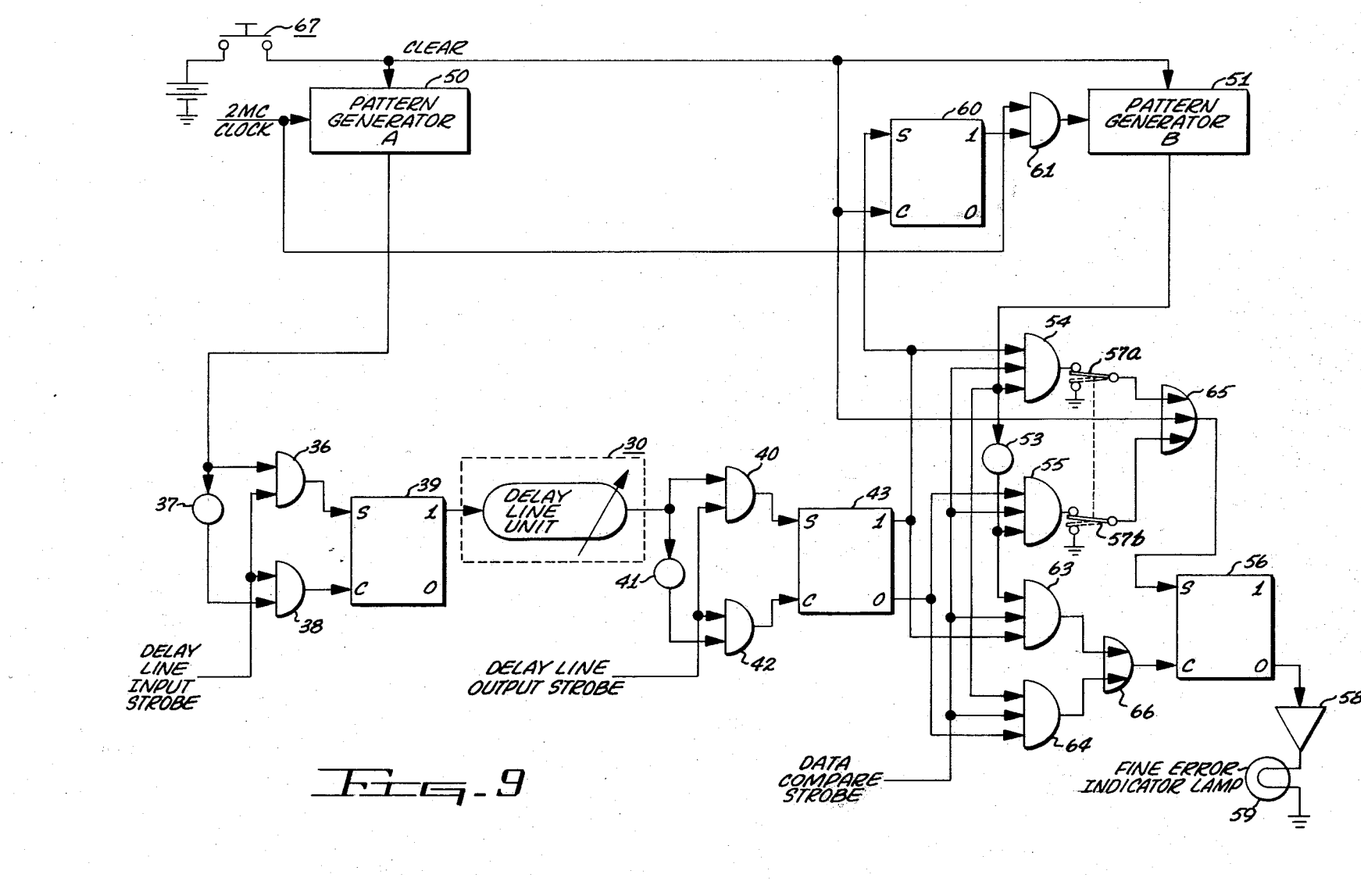
FIGURE 9 is a logical schematic diagram of the logic circuits for effecting the Delay Line Unit fine adjustment.

The logic diagrams of FIGURES 6, 7, and 9 are presented in slightly simplified form in order that the inventive concepts may be readily understood. For example, instantaneous response times are assumed such that no special logic is shown for overcoming logic race conditions which occur as the speed of operation is increased until the circuits cannot be assumed to respond immediately. The changes and additions required to overcome logic race conditions and other problems associated with extremely high speed operation are known to all skilled in the art and are of no consequence to an understanding of the invention.

LOGICAL ORGANIZATION

Referring now to FIGURE 6, a logical schematic diagram is presented of apparatus for providing sampling pulses designated respectively the Delay Line Unit Input Strobe, the Delay Line Unit Output Strobe, and the Data Compare Strobe. The asymmetrical clock signal from the two megacycle clock generators 10 is applied to inputs of two electrical relay lines 11 and 12. The electrical delay lines 11 and 12 are of the well-known lumped constant type which provide relatively short time delays to pulses passed through them. A plurality of taps along these electrical delay lines permit the selection of one of several nominal delays with a sample switching arrangement. The electrical delay lines 11 and 12 for this exemplary embodiment are provided with taps affording nominal delays of 0, 100, 120, 140, and 160 nanoseconds. The output from the electrical delay line 11 is impressed on one input to an AND-gate 14, and the output from the electrical delay line 12 is impressed on one input to another AND-gate 15. One or the other of these AND-gates 14 and 15 may have its remaining input at 1 according to the position of a Strobe Selector Switch 13.

The output signals from the AND-gates 14 and 15 are impressed on the two inputs to an OR-gate 16. The output signal from the OR-gate 16 drives one input to each of a pair of AND-gates 18 and 19. The clock signal from the two megacycle clock generator 10 drives one input to each of another pair of AND-gates 17 and 20. The four AND-gates 17, 18, 19, and 20 each have logic signals which are selectively controlled by the Strobe Selector Switch 13 applied individually to their remaining inputs. The output signals from the AND-gates 17 and 18 are impressed on the inputs to an OR-gate 21 which issues the Delay Line Unit Output Strobe signal. The AND-gates 19 and 20 have their output signals impressed on the inputs to another OR-gate 22 which issues the Delay Line Unit Input Strobe. The Delay Line Unit Output Strobe is applied to the input of a 180 nanosecond electrical delay line 23. The output signal from the electrical delay line 23 is designated the Data Compare Strobe.

According to the position of the Strobe Selector Switch 13, the Delay Line Unit Input Strobe and Delay Line Unit Output Strobe may be coincident or either may lead the other by a predetermined selectable amount. The manner in which the varying time relationships of the Delay Line Unit Input Strobe, the Delay Line Unit Output Strobe, and the Data Compare Strobe are utilized in effecting the fine adjustment of the Delay Line Unit under test will be described in detail below.

FIGURE 7 is a logical schematic diagram of apparatus for effecting the coarse delay line test and adjustment. The two megacycle clock signal from the clock generator 10 of FIGURE 6 is utilized to advance a twelve-bit counter 31 every 500 nanoseconds. A zero count detector 32 comprising a 12-input AND-gate is enabled only when all twelve stages of the twelve-bit counter 31 are cleared inasmuch as the 0 output from each flip-flop stage is connected to a separate input to the zero count detector 32. When the zero count detector 32 is enabled indicating a zero decode, one input to an AND-gate 36 driven thereby is 1. At all other times, the output from the zero count detector 32 is 0 inverted through a logical inverter 36 to provide a 1 signal applied to one input of another AND-gate 38. The remaining input to each of the AND-gates 36 and 38 is driven by the Delay Line Unit Input Strobe which, for the coarse adjustment, is considered coincident with the two megacycle clock signal.

The output signal from the AND-gate 36 and the output signal from the AND-gate 38 are applied, respectively, to the set and clear inputs to a flip-flop 39. Thus, when a zero count is decoded from the twelve-bit counter 31, the Delay Line Unit Input Strobe fully enables the AND-gate 36, to set the flip-flop 39. After the next succeeding two megacycle clock signal, the twelve-bit counter 31 count will no longer be zero such that the Delay Line Unit Input Strobe will enable the AND-gate 38 and clear the flip-flop 39 which will remain in its clear state until the twelve-bit counter 31 has cycled through its full capacity and returned to an all zeroes condition. The output signal from the 1 terminal of the flip-flop 39 drives the Delay Line Unit 30 under test. Hence, it may be seen that a single 1-bit pulse is introduced onto the Delay Line Unit 30 each time a zero count is detected in the twelve-bit counter 31.

The Delay Line Unit 30 typically comprises a driver circuit which accepts information pulses, an input transducer energized by the driver circuit, a magnetostrictive delay line activated by the input transducer, an output transducer which may be physically adjusted along the delay line and which detects information pulses traveling along the delay line, and an output circuit driven by the signal from the output transducer, which output circuit converts the delayed information pulses into pulses compatible with the standard logic circuitry of the functional environment. Delay Line Units are normally purchased, tested, and utilized as integral units and are treated as such in this specification.

A selectable count decoder comprising a series of switches 34 and a twelve-input AND-gate 33 may be set to respond to one, and only one, configuration of the twelve-bit counter 31. If the nominal length to which the Delay Line Unit 30 is being adjusted is known, the series of switches 34 may be set, in increments of 500 nanoseconds, to the appropriate count above zero corresponding to the nominal delay.

A 1-bit pulse introduced into the Delay Line Unit 30 at a twelve-bit counter 31 count of zero traverses through and passes from the Delay Line Unit 30 and is applied to a first input to an AND-gate 40 and also to the input to an inverter 41 which drives a first input to an AND-gate 42. The remaining inputs to the AND-gates 40 and 42 are driven by the Delay Line Unit Output Strobe which, for the coarse adjustment, is coincident with the Delay Line Unit Input Strobe and the two megacycle clock signal. The AND-gate 40 and the AND-gate 42 drive the set and clear inputs, respectively, to a flip-flop 43. Thus, when a 1-bit is read from the Delay Line Unit 30, the AND-gate 40 is enabled coincidentally with the Delay Line Unit Output Strobe to set the flip-flop 43. At all other times, one input to the AND-gate 42, driven by the output signal from the logical inverter 41 is 1; and, at each occurrence of a Delay Line Unit Output Strobe, the AND-gate 42 is fully enabled to drive the clear input to the flip-flop 43.

The output signal from the 1 terminal of the flip-flop 43 is applied to one input to an AND-gate 44 while the output signal from the 0 terminal of the flip-flop 43 is applied as one input to another AND-gate 45. The remaining inputs to the AND-gates 44 and 45 are driven by the signal from the selectable count decoder twelve-input AND-gate 33.

The output signal from the AND-gate 44 drives the set input and the output signal from the AND-gate 45 drives the clear input to a flip-flop 46. The output signal from the 1 terminal of the flip-flop 46 is applied to the input to a lamp driver amplifier 48. The output signal from the lamp driver amplifier 48 is connected in series with the filament of a Coarse Compare Indicator Lamp 49. Thus, when the flip-flop 46 is in the clear state, the Coarse Compare Indicator Lamp 49 is not energized; conversely, when the flip-flop 46 is in the set state, the Coarse Compare Indicator Lamp 48 is energized to indicate the occurrence of a coarse adjustment "compare" condition.

Referring now to FIGURE 9, apparatus for effecting the fine Delay Line Unit test and adjustment is shown. It will be observed that a portion of the fine adjustment apparatus is common with the coarse adjustment apparatus. Suitable switching means, not shown, is utilized to select one or the other function for the common apparatus. First and second seven-bit pattern generators 50 and 51 are wired to provide a pseudo-random output pattern which is nonrecurring for 127 input pulses from the two megacycle clock generator 10 of FIGURE 6. The output signal from the first pattern generator 50 is impressed upon one input to the AND-gate 36 and, through the inverter 37, on one input to the AND-gate 38 in inverted form. The remaining inputs to the AND-gates 36 and 38 are driven by the Delay Line Unit Input Strobe.

The output signal from the AND-gate 36 and the output signal from the AND-gate 38 drive the set and clear inputs, respectively, to the flip-flop 39. The output signal from the 1 terminal of the flip-flop 39 is utilized to drive the Delay Line Unit 30 under test. The delayed signal read from the Delay Line Unit 30 is impressed on one input to the AND-gate 40 and, through an inverter 41, to one input to the AND-gate 42 in inverted form. The remaining inputs to the AND-gates 40 and 42 are driven by the Delay Line Unit Output Strobe. The output signal from the AND-gate 40 and the output signal from the AND-gate 42 drive the set and clear inputs, respectively, to the flip-flop 43.

The output signal from the 1 terminal of the flip-flop 43 drives one input each to a pair of AND-gates 54 and 63 and also the set input to a flip-flop 60. The clear input to the flip-flop 60 is connected to one terminal of a normally-open, spring loaded pushbutton "Clear" switch 67. The output signal from the 1 terminal of the flip-flop 60 drives a first input to an AND-gate 61 while the remaining input to the AND-gate 61 is driven by the two megacycle clock signal. The output signal from the AND-gate 61 is utilized to advance the second pattern generator 51.

The output signal from the pattern generator 51 is impressed on one input each to a pair of AND-gates 54 and 64 and on the input to an inverter 53 which drives one input each to another pair of AND-gates 55 and 63. The outputs from the AND-gates 54 and 55 are connected to separate inputs to an OR-gate 65 through separate sections 57A and 57B of a two position Automatic Clear/Hold Switch. A third input to the OR-gate 65 is connected to one terminal of the "Clear" switch 67. The output signals from the AND-gates 63 and 64 drive the two inputs to another OR-gate 66. The output signal from the OR-gate 65 and the output signal from the OR-gate 66 are impressed onto the set and clear inputs, respectively, to a flip-flop 56. The output signal from the 0 terminal of the flip-flop 56 drives a lamp driver amplifier 58 which drives a Fine Error Indicator Lamp 59. Thus, when the flip-flop 56 is in the set state, the Fine Error Indicator Lamp 59 is not energized; conversely, when the flip-flop 46 is in the clear state, the Fine Error Indicator Lamp 59 is energized to indicate the occurrence of a fine adjustment "no compare" condition.

OPERATION

Figure 8A:
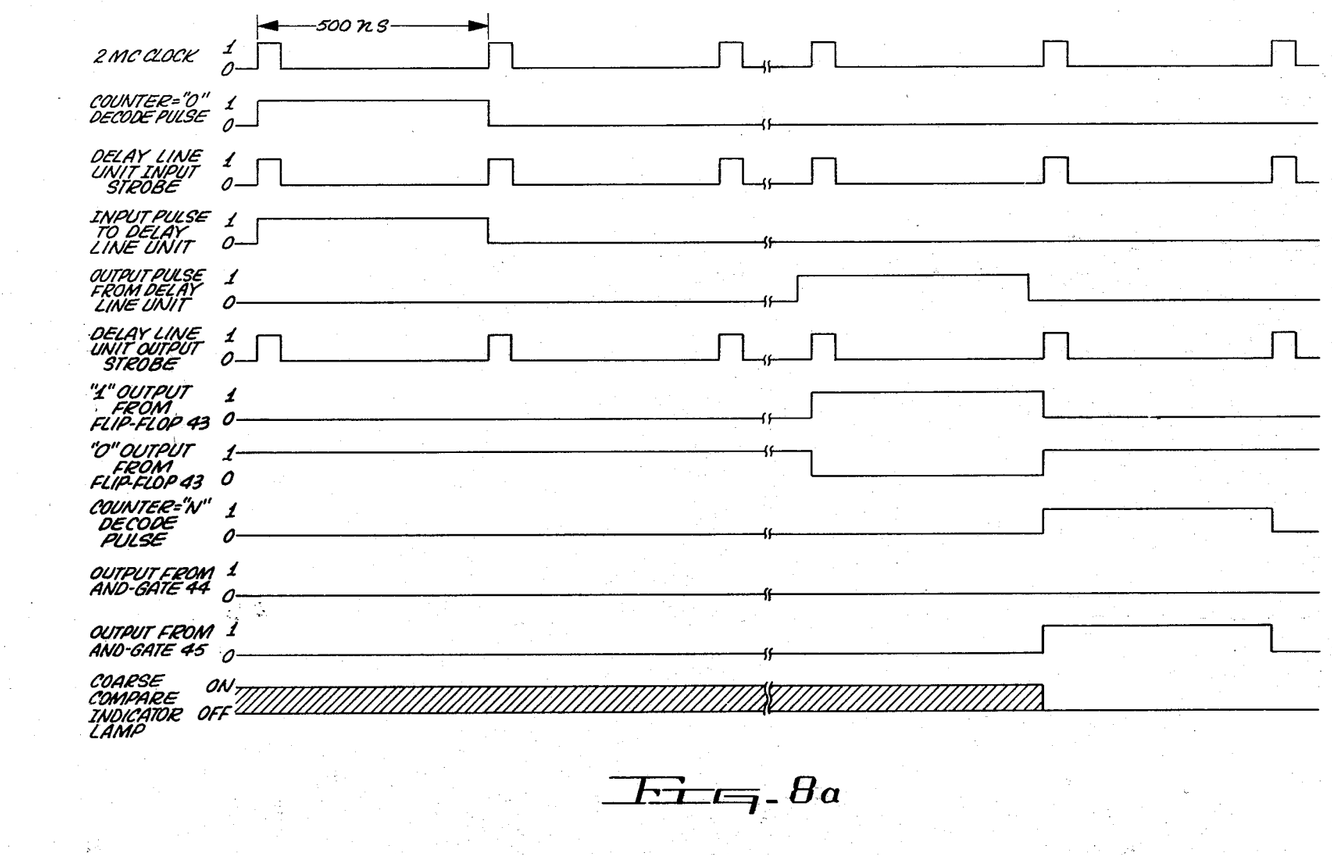
FIGURES 8A, 8B, and 8C are timing diagrams depicting the sequence of events occurring during a coarse adjustment test for three different delay settings of the Delay Line Unit under test.
Figure 8B:
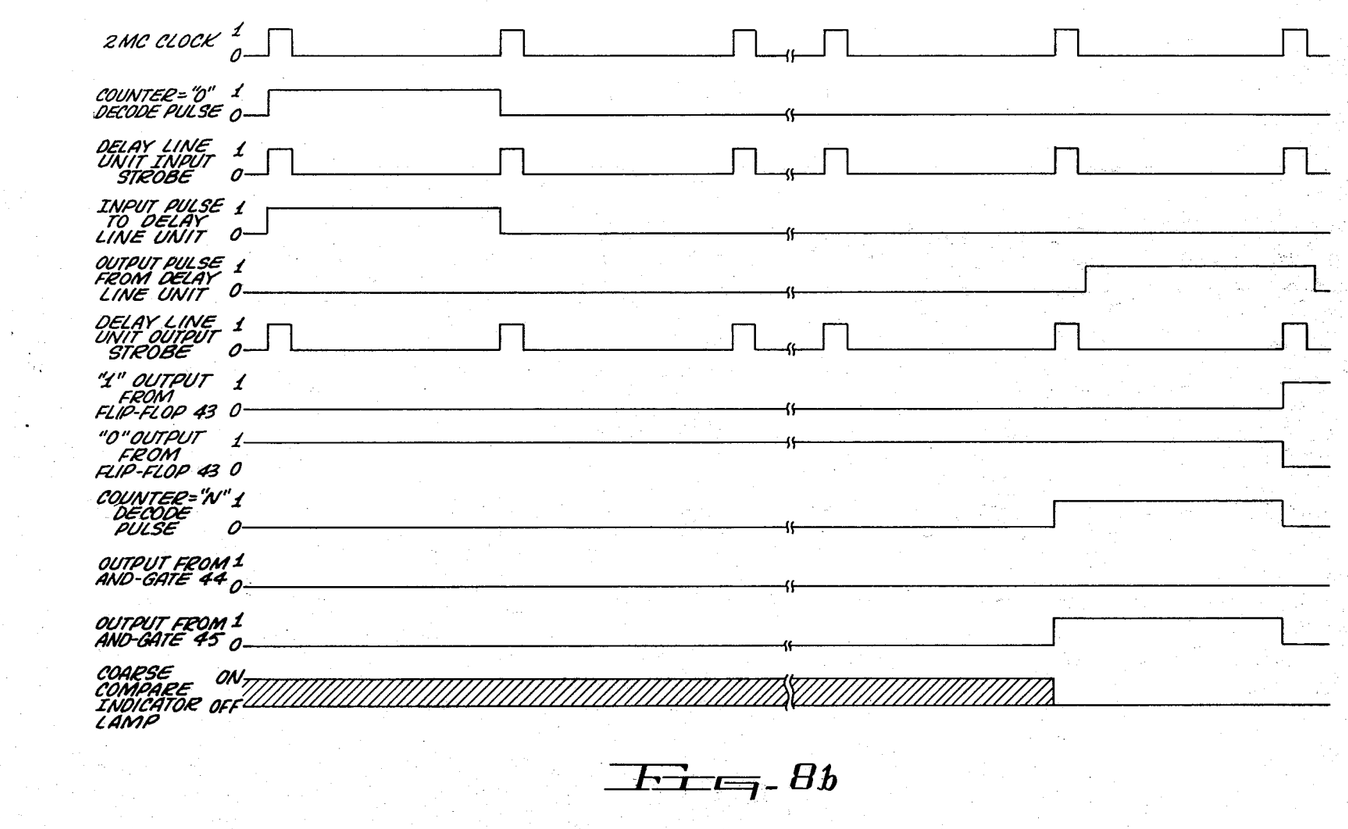
Figure 8C:
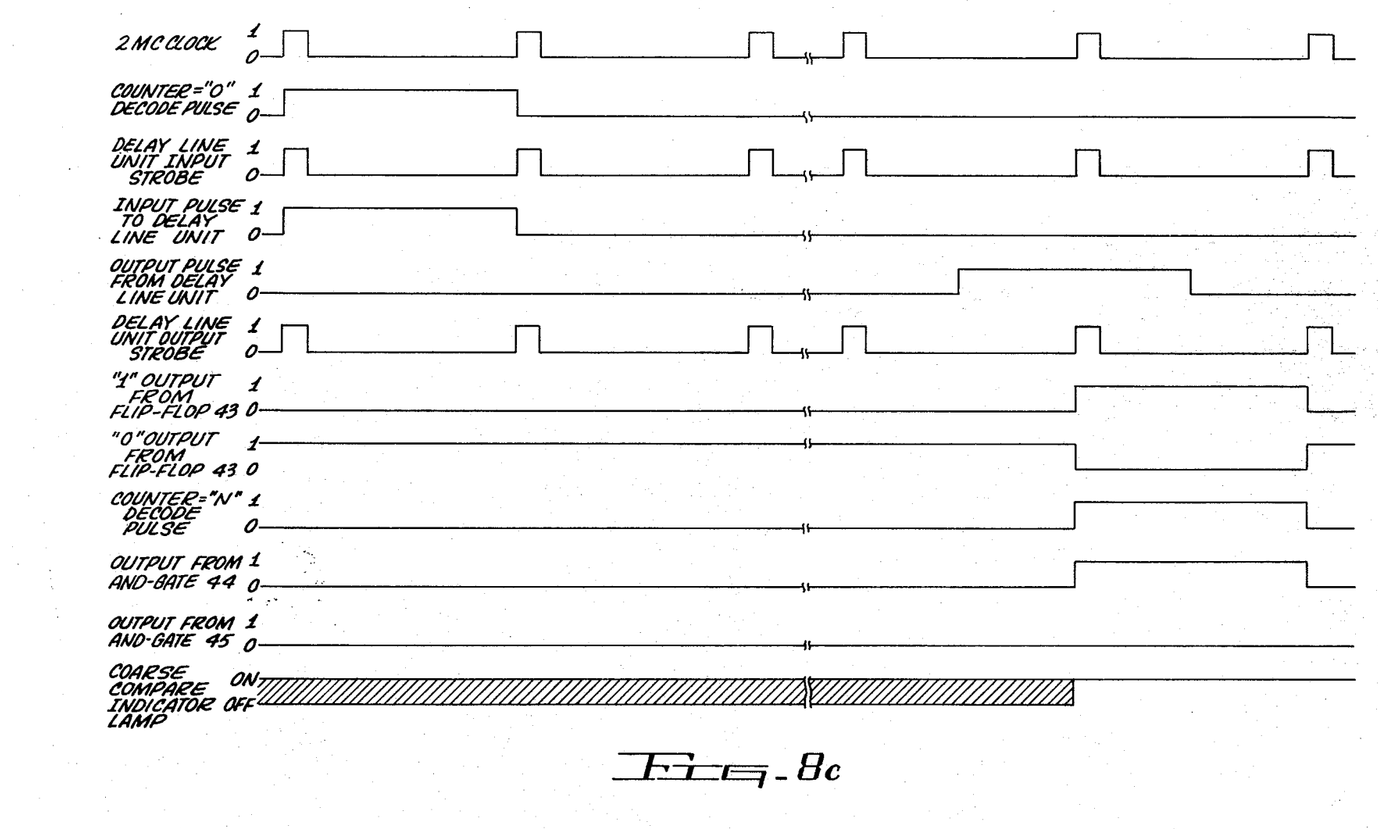

The method and apparatus for performing the coarse adjustment is best understood with reference to the logical schematic diagram of FIGURE 7 and the timing diagrams of FIGURES 8A, 8B, and 8C. The two megacycle clock signal advances the twelve-bit counter 31 such that the twelve stages of the counter 31 will all be in the clear state once each 4096 clock pulses and the zero count detector 32 will be enabled until the succeeding clock pulse again advances the counter 31. When the zero count detector 32 is enabled, its output impresses a 1 signal on a first input to the AND-gate 36. The remaining input to the AND-gate 36 is driven by the Delay Line Unit Input Strobe such that the AND-gate 36 is fully enabled and issues a 1 pulse to the set input to the flip-flop 39 when the Delay Line Unit Input Strobe arises during the period in which the 12 stages of the counter 31 are all zeroes. The flip-flop 39, previously in the clear state, is set and remains set until the next succeeding two megacycle clock pulse advances the counter 31 and thus causes the zero count detector 32 to become disabled. When the zero count detector 32 is disabled and issues a 0, a first input to the AND-gate 38 is placed at the 1 level through the logical inverter 37. The AND-gate 38 is fully enabled by the next succeeding Delay Line Unit Input Strobe, and its 1 output pulse is utilized to clear the flip-flop 39. Thus, as indicated in the timing diagrams of FIGURES 8A, 8B, and 8C, a single 1-bit pulse is introduced into the Delay Line Unit 30 from the 1 terminal of the flip-flop 39 when a count of zero is decoded from the twelve-bit counter 31.

The switches 34 of the selectable count decoder are set in a predetermined pattern according to the nominal delay to which the Delay Line Unit 30 is being adjusted, each count representing 500 nanoseconds of delay. Therefore, one, and only one, configuration of states of the twelve stages of the twelve-bit counter 31 can enable the selectable count decode AND-gate 33. As the test 1-bit pulse propagates through the Delay Line Unit 30, the two megacycle clock continues to advance the twelve-bit counter 31. When the counter 31 reaches the unique selected configuration, the selectable count decode AND-gate 33 becomes enabled until the next succeeding two megacycle clock pulse advances the counter 31 beyond the unique configuration. Hence, the selectable count decode AND-gate 33 is enabled once every 4096 two megacycle clock pulses and issues a 1 pulse delayed from that entered into the Delay Line Unit 30 by an amount determined by the setting of the switches 34.

The output from the Delay Line Unit 30 is connected to a first input to the AND-gate 40 and through an inverter to a first input to the AND-gate 42. The remaining inputs to the AND-gates 40 and 42 are driven by the Delay Line Unit Output Strobe which, for a coarse adjustment test, is coincident with the Delay Line Unit Input Strobe and the two megacycle clock pulses. When the test 1-bit pulse read from the Delay Line Unit 30 holds the first input to the AND-gate 40 at 1, the next succeeding Delay Line Unit Output Strobe fully enables the AND-gate 40 to set the flip-flop 43. When the output from the Delay Line Unit 30 returns to 0, the inverter 41 impresses a 1 on the first input to the AND-gate 42, and the next succeeding Delay Line Unit Output Strobe fully enables the AND-gate 42 such that its output signal clears the flip-flop 43.

The 1 and 0 terminals from the flip-flop 43 are connected, respectively, to one input each to the AND-gates 44 and 45 while the second inputs to each of the AND-gates 44 and 45 are driven by the output from the selectable count decode AND-gate 33. Therefore, if the flip-flop 43 is set when the selectable count decode AND-gate 33 is enabled, both inputs to the AND-gate 44 will be 1, and the AND-gate 44 will be enabled. On the other hand, if the flip-flop 43 is clear when the selectable count decode AND-gate 33 is enabled, the AND-gate 45 will be enabled. Assuming that there is coincidence at the two inputs of the AND-gate 44; i.e., a "compare" condition is detected, the resulting 1 output signal from the AND-gate 44 is impressed on the set input to the flip-flop 46 and the Coarse Compare Indicator Lamp 49 will light or will remain lit if it were previously lit. If a "no compare" condition is present, the 0 terminal of the flip-flop 43 will issue a 1; and the AND-gate 45, rather than the AND-gate 44, will be fully enabled. The 1 outpu signal from the AND-gate 45 will be impressed on the clear input to the flip-flop 46 such that the Coarse Compare Indicator Lamp 49 will be extinguished or remain off if it were previously off to indicate the detection of a "no compare" condition.

Inasmuch as this process is repeated many times each second and the Delay Line Unit 30 output transducer may be moved through a distance corresponding to delays of several bit positions, the Coarse Compare Indicator Lamp 49 will be observed to go on and off as Delay Line Unit 30 delay is manually adjusted. In this manner, a range of coincidence between the extremes of "compare" is observed and the Delay Line Unit 30 adjustment is set to the center of this observed range.

FIGURE 8A is a timing diagram of the important signals arising during a coarse adjustment test when the Delay Line Unit 30 is adjusted just short of coincidence. As shown in FIGURE 8A with reference to FIGURE 7, the coincidence of the test 1-bit read from the Delay Line Unit 30 and the Delay Line Unit Output Strobe enables the AND-gate 40 to set the flip-flop 43. The flip-flop 43 is set a single two megacycle clock pulse too early to achieve coincidence between 1 signals from the 1 terminal of the flip-flop 43 and the selectable count decode AND-gate 33 at the input to the AND-gate 44.

Thus, when the selectable count decode AND-gate 33 issues a 1 pulse, the signal from the 0 terminal of the flip-flop 43 is also 1 such that the AND-gate 45 is enabled to clear the flip-flop 46 and extinguish the Coarse Compare Indicator Lamp 49 to indicate a "no compare" condition detected by the just completed test. If the flip-flop 46 were previously clear, it remains clear and the Coarse Compare Indicator Lamp 49 remains off.

FIGURE 8B is a timing diagram of the important signals arising during a coarse adjustment test when the Delay Line Unit 30 is adjusted just beyond coincidence. As shown in FIGURE 8B, with reference to FIGURE 7, the test 1-bit read from the Delay Line Unit 30 and the Delay Line Unit Output Strobe coincide to enable the AND-gate 40 and set the flip-flop 43 when the Delay Line Unit 30 is so adjusted. In this instance, the flip-flop 43 is set a single two megacycle clock cycle beyond a period when the selectable count decode AND-gate 33 is enabled at the predetermined count and issues a 1 pulse. Therefore, the 1 pulse issuing from the selectable count decode AND-gate 33 and the 1 signal issuing from the 0 terminal of the flip-flop 43 in the clock period prior to that in which the flip-flop 43 is set combine to enable the AND-gate 45. The output signal from the AND-gate 45 is impressed on the clear input to the flip-flop 46 which is cleared, or held clear if it were previously in the clear state, such that the Coarse Compare Indicator Lamp 49 is extinguished, or remains off, to indicate a "no compare" condition detected by the just completed test.

FIGURE 8C illustrates the relationship of the important signals arising during the coarse adjustment test when the Delay Line Unit 30 is properly adjusted within the resolution of the coarse adjustment. It will be observed that the Delay Line Unit Output Strobe issues approximately intermediate the period during which the output signal from the Delay Line Unit 30 is 1. The AND-gate 40 is fully enabled by the Delay Line Unit Output Strobe to set the flip-flop 43 during the same period in which the selectable count decode AND-gate 33 is enabled. Therefore, the signal issuing from the selectable count decode AND-gate 33 and the signal issuing from the 1 terminal of the flip-flop 43 are simultaneously 1 to fully enable the AND-gate 44. The output signal from the AND-gate 44 is impressed on the set input to the flip-flop 46 which is set, or remains set; and the Coarse Compare Indicator Lamp 49 lights, or remains lit, to indicate a "compare" condition detected by the just completed test.

When the Delay Line Unit 30 has been adjusted to the delay length depicted approximately in FIGURE 8C by observing the extreme positions of the adjustments at which "compare" conditions are detected and then setting the delay length to the approximate midpoint of these extremes, a coarse/fine switch (not shown) is placed into the fine position to appropriately switch the logic common to both the coarse and fine adjustment apparatus so that a fine adjustment can be undertaken.

With reference to FIGURE 9, a logical schematic diagram of the fine adjustment apparatus, and FIGURES 10A, 10B, and 11, the fine adjustment timing diagrams, the operation of the fine adjustment apparatus will now be described. The Strobe Selector Switch 13 of FIGURE 6 is placed in the 0 position in order that the Delay Line Unit Input Strobe and Delay Line Unit Output Strobe concur with the two megacycle clock signal. Depressing the "Clear" pushbutton switch 67 impresses a voltage representing a 1 logic level from the voltage source 68 onto the pattern generator 50, pattern generator 51, the clear input to the flip-flop 60, and one input to the OR-gate 65 which drives the set input to the flip-flop 56. Thus, when the "Clear" pushbutton switch 67 is depressed, the pattern generators 50 and 51 are completely cleared, the flip-flop 56 is set, and the flip-flop 60 is cleared.

When the "Clear" pushbutton 67 is released, pattern generator 50 is permitted to start and is advanced by the two megacycle clock signal to issue serially a recurring, pseudo-random pattern of 1's and 0's. The series of 1's and 0's issuing from the pattern generator 50 is applied to one input to the AND-gate 36 and, through an inverter 37, to one input to the AND-gate 38. The remaining inputs to each of the AND-gates 36 and 38 are driven by the Delay Line Unit Input Strobe. Therefore, when the output from the pattern generator 50 is 1 and the Delay Line Unit Input Strobe is present, the AND-gate 36 is enabled to set the flip-flop 39. When the output from the pattern generator 50 is 0, the 0 is inverted through the inverter 37 and impressed as a 1 on an input to the AND-gate 38 such that the Delay Line Unit Input Strobe fully enables the AND-gate 38 to clear the flip-flop 39. Thus, the flip-flop 39 follows the pattern issued from the pattern generator 50 switching states at times controlled by the occurrence of the Delay Line Unit Input Strobe.

The first bit issued from the pattern generator 50 and propagated through the Delay Line Unit 30 after the "Clear" pushbutton switch 67 has been depressed and released in a 1-bit because of the circuit arrangement within the pattern generator 50. This first bit, when read from the Delay Line Unit 30, is impressed on one input to the AND-gate 40. The Delay Line Unit Output Strobe which occurs during the period this first 1-bit is being read from the Delay Line Unit 30 will fully enable the AND-gate 40 such that the output from the AND-gate 40 sets the flip-flop 43. When the flip-flop 43 is set, the output signal from its 1 terminal is utilized to set the flip-flop 60 which previously had been cleared by depressing the "Clear" pushbutton switch 67. When the flip-flop 60 is set, the signal issuing from its 1 terminal is impressed on one input to the AND-gate 61 which has its other input driven by the two megacycle clock signal. Thus, after the "Clear" pushbutton switch 67 has been depressed and released, the first 1-bit has propagated through the Delay Line Unit 30, and the flip-flop 60 has been set, the two megacycle clock signal repetitively fully enables the AND-gate 61 which advances the second pattern generator 51. Therefore, the pattern generator 51 generates the same pseudo-random serial signal pattern as that issued from the pattern generator 50, but delayed in time an amount determined by the previous adjustment to the Delay Line Unit 30; i.e., before the "Clear" pushbutton switch 67 was last depressed.

Subsequent bits read from the Delay Line Unit 30 enable the AND-gate 40 when the Delay Line Unit Output Strobe is present if the bit read from the Delay Line Unit 30 is a 1 or the AND-gate 42 if the bit read from the Delay Line Unit is a 0 inverted to 1 through the inverter 41. The output signal from the 1 terminal of the flip-flop 43 is impressed on one in put each to the AND-gates 54 and 63 while the output signal from the 0 terminal of the flip-flop 43 drives one input each to the AND-gates 55 and 64. A second input to each of the AND-gates 54 and 63 is driven directly by the output signal from the pattern generator 51. A second input to each of the AND-gates 54 and 63 is driven by the output from the inverter 53 which is driven directly by the output signal from the pattern generator 51. Third inputs to each of the AND-gates 54, 55, 63, and 64 are driven by the Data Compare Strobe. With this arrangement, if the flip-flop 43 is set thus issuing a 1 from its 1 terminal the pattern generator 51 output is also 1, the Data Compare Strobe will fully enable the AND-gate 54. Assuming the mechanically ganged sections 57A and 57B of the Automatic Clear/Hold Switch to be in the automatic clear (closed) position, the 1 output signal from the AND-gate 54 enables the OR-gate 65 to set the flip-flop 56. With the flip-flop 56 set, the output signal from its 0 terminal will be 0 such that the lamp driver 58 will be disabled and the Fine Error Indicator Lamp 59 will be extinguished or remain off indicating that no error was detected between the just compared bits.

If the flip-flop 43 is clear thus issuing a 1 from its 0 terminal when the pattern generator 51 output is a 0 inverted through the inverter 53 to a 1, the Data Compare Strobe will fully enable the AND-gate 55, and its output signal will enable the OR-gate 65 to set the flip-flop 56, the Fine Error Indicator Lamp 59 extinguishing or remaining off indicating a no error condition between the just compared bits.

If the flip-flop 43 is clear thus issuing a 1 from its 0 terminal when the pattern generator 51 output is a 1, the AND-gate 64 becomes fully enabled with the occurrence of the Data Compare Strobe. The output signal from the AND-gate 64 enables the OR-gate 66 which drives the clear input to the flip-flop 56. When the flip-flop 56 is in the clear state, the 1 output signal from its 0 terminal enables the lamp driver 58, and the Fine Error Indicator Lamp 59 lights or remains lit to indicate that the just completed data compare operation detected a "no compare" condition.

If the flip-flop 43 is set thus issuing a 1 from its 1 terminal when the pattern generator 51 output is a 0 inverted through the inverter 53 to a 1, the AND-gate 63 becomes fully enabled with the Data Compare Strobe. The output signal from the AND-gate 63 enables the OR-gate 66 to clear the flip-flop 56 such that the Fine Error Indicator Lamp 59 lights or remains lit to indicate that the just completed data compare operation detected a "no compare" condition.

Figure 10A:
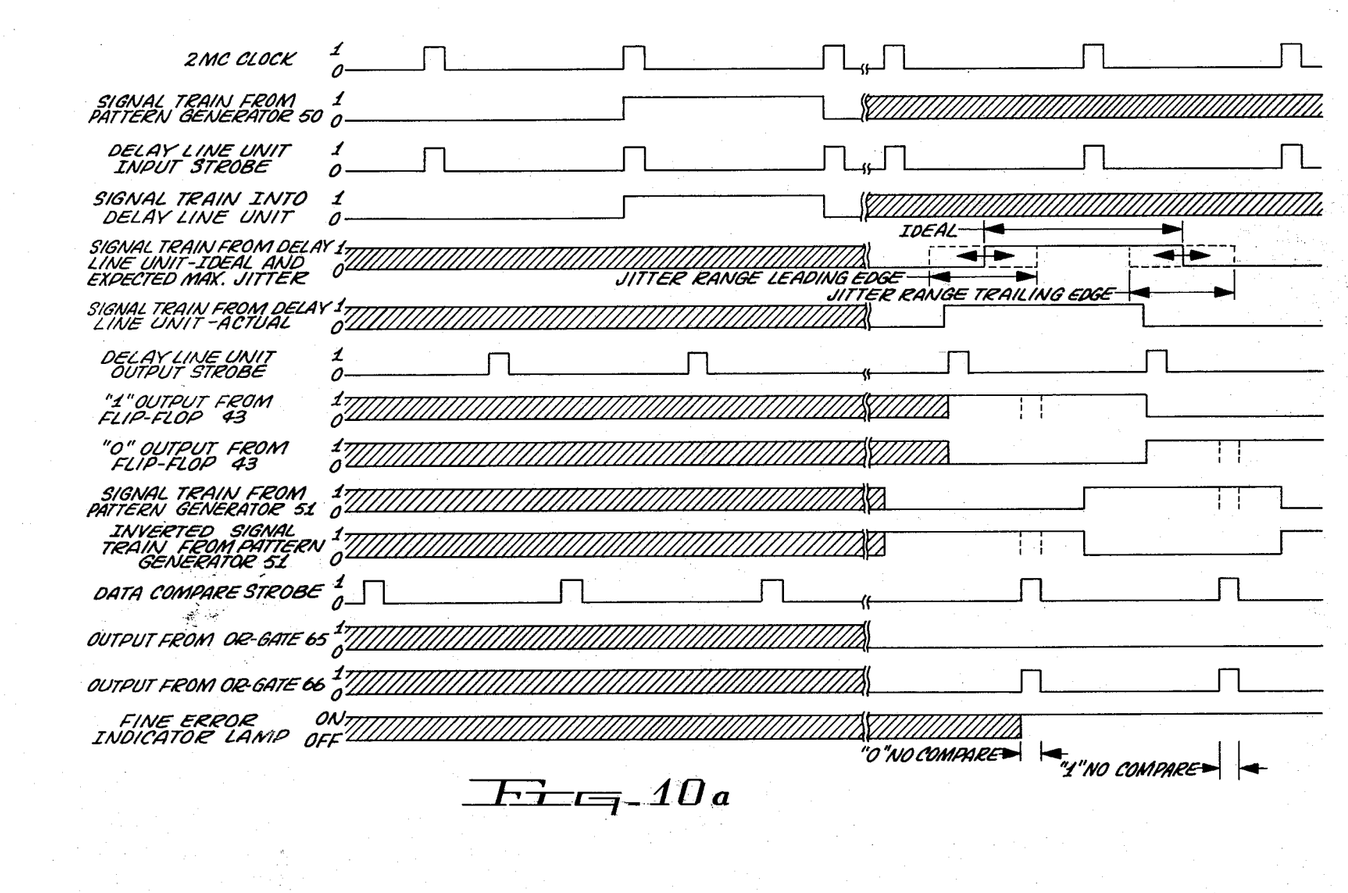
FIGURES 10A and 10B are timing diagrams depicting the sequence of events occurring during a fine trailing edge adjustment test for two different timing relationships between the Delay Line Unit Input Strobe and Delay Line Unit Output Strobe.
Figure 10B:
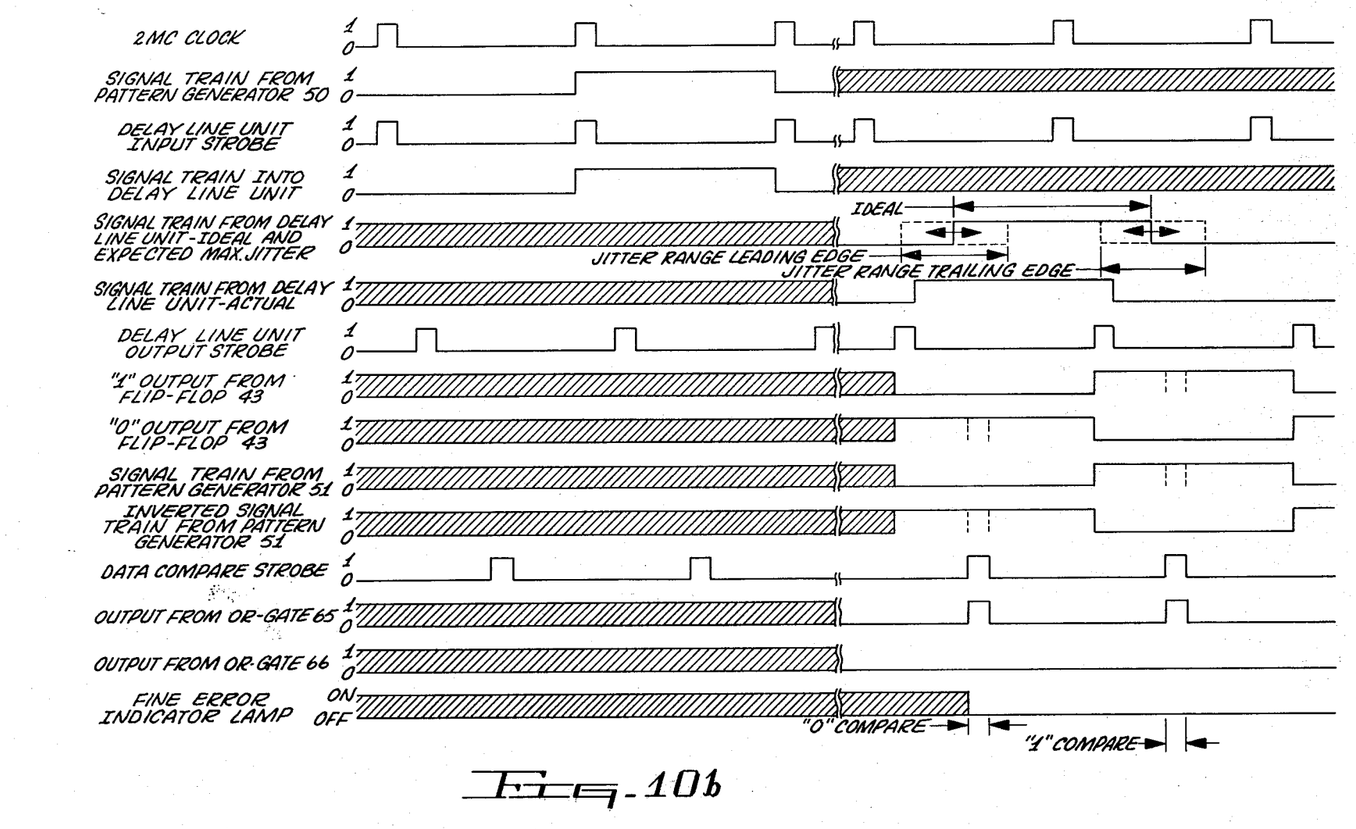
Figure 11:
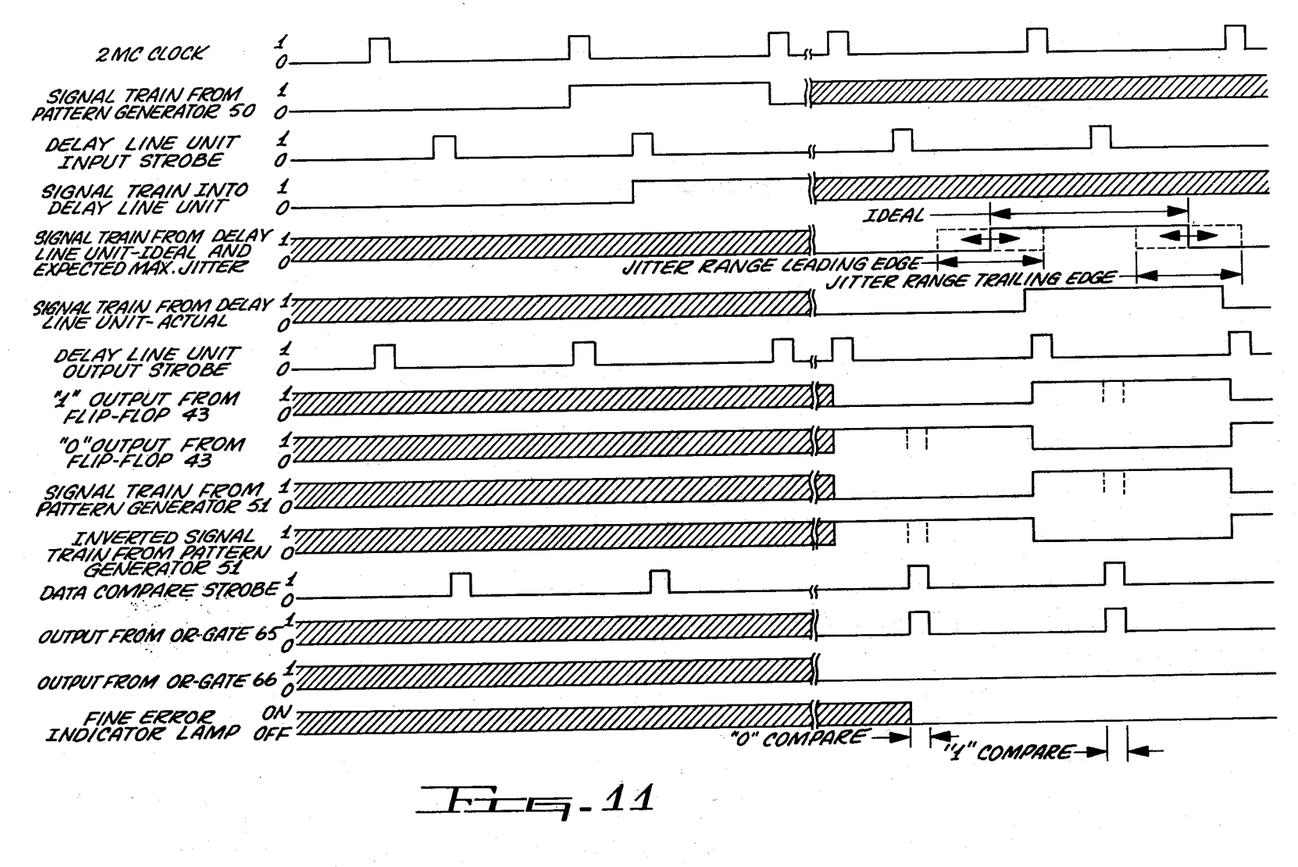
FIGURE 11 is a timing diagram depicting the sequence of events occurring during a fine adjustment leading edge test.

The ideal arrival time of an exemplary 1-bit entered into the Delay Line Unit 30 following a properly executed coarse adjustment is depicted by the solid line in the "Ideal Expected Maximum Jitter" trace of FIGURES 10A, 10B, and 11. The dashed lines indicate the maximum extent of positive and negative time excursions of the delayed signal under severe jitter conditions for the exemplary Delay Line Unit 30. It will be seen that when the fine adjustment test is first tried following a proper coarse adjustment with the Strobe Selector Switch 13 of FIGURE 6 in the 0 position, no error should be detected.

In the trailing edge test positions of the Strobe Selector Switch 13, the Delay Line Unit Input Strobe leads the Delay Line Unit Output Strobes by 100 nanoseconds (position 1) 120 nanoseconds (position 2), 140 nanoseconds (position 3), and 160 nanoseconds (position 4). In the leading edge test positions of the Strobe Selector Switch 13, the Delay Line Unit Input Strobe trails the Delay Line Unit Output Strobe by 100 nanoseconds (position 1), 120 nanoseconds (position 2), 140 nanoseconds (position 3), and 160 nanoseconds (position 4). In all positions of the Strobe Selector Switch 13, the Data Compare Strobe trails the Delay Line Unit Output Strobe by 180 nanoseconds.

FIGURE 10A is a timing diagram of the important signals arising during a fine adjustment test after a properly executed coarse adjustment and with the Strobe Selector Switch 13 in the trailing edge/4 position. It will be observed that the Delay Line Unit Output Strobe trails the Delay Line Unit Input Strobe by approximately 160 nanoseconds and the Data Compare Strobe trails the Delay Line Unit Output Strobe by approximately 180 nanoseconds. Assume that, because of some jitter condition, the actual signal train is read from the Delay Line Unit 30 somewhat earlier than ideal as depicted by the "Signal Train from Delay Line Unit-Actual" trace of FIGURE 10A. Examining, by way of example, the 1-bit read from the Delay Line Unit 30 during the time period depicted; it will be seen that a Delay Line Unit Output Strobe occurs just after the output signal from the Delay Line Unit 30 becomes 1. These two 1 signals combine to fully enable the AND-gate 40 and set the flip-flop 43 with the 1 issuing from the 1 terminal of the flip-flop 43 impressed on first inputs to each of the AND-gates 54 and 63. The Data Compare Strobe arises 180 nanoseconds after the Delay Line Unit Output Strobe to place 1 signals on second inputs to the AND-gates 54 and 63. However, the pattern generator 51 output signal is, at this instant, 0 such that only the AND-gate 63, with its third input driven by the 1 output from the inverter 53, becomes fully enabled. The 1 output signal from the AND-gate 63 enables the OR-gate 66 to clear the flip-flop 56 thereby enabling the lamp driver 58 and energizing the Fine Error Indicator Lamp 59 to indicate that a "no compare" condition was detected during the just completed bit pattern compare test.

Still referring to FIGURE 10A, the next succeeding bit of information read from the Delay Line Unit 30 will be strobed as a 0 inasmuch as the Delay Line Unit Output Strobe arises just after the output signal from the Delay Line Unit 30 has switched from 1 to 0. Therefore, the AND-gate 42 will be fully enabled by the Delay Line Unit Output Strobe and the signal from the Delay Line Unit 30 inverted through the inverter 41 to clear the flip-flop 43. The 1 signal from the 0 terminal of the flip-flop 43 is impressed on first inputs to the AND-gates 55 and 64, and the Data Compare Strobe is applied to second inputs to the AND-gates 55 and 64 180 nanoseconds after the occurrence of the Delay Line Unit Output Strobe. However, the pattern generator 51 output signal is 1 such that only the AND-gate 64 is fully enabled by the Data Compare Strobe. The 1 output signal from the AND-gate 64 enables the OR-gate 66 to again impress a 1 pulse on the clear input to the flip-flop 56. The flip-flop 56 therefore remains in the clear state, and the Fine Error Indicator Lamp 59 remains lit to indicate that the "no compare" condition continues.

FIGURE 10B is a timing diagram, similar to FIGURE 10A, of the important signals arising during a fine adjustment test with the Strobe Selector Switch 13 in the trailing edge/1 position rather than the trailing edge/4 position. The Delay Line Unit Output Strobe trails the Delay Line Unit Input Strobe by approximately 100 nanoseconds, and the Data Compare Strobe trails the Delay Line Unit Output Strobe by approximately 180 nanoseconds. Assuming the same jitter condition as that shown in FIGURE 10A, the actual signal train is read from the Delay Line Unit 30 somewhat earlier than ideal as depicted by the "Signal Train from Delay Line Unit-Actual" trace of FIGURE 10B. Again examining, by way of example, the 1-bit read from the Delay Line Unit 30, it will be seen that a Delay Line Unit Output Strobe occurs just before the output signal from the Delay Line Unit 30 changes from 1 to 0; i.e., just within the trailing edge of the 1-bit. These two 1 signals fully enable the AND-gate 40 to set the flip-flop 43 with the resulting 1 issuing from the 1 terminal of the flip-flop 43 impressed on first inputs to the AND-gates 54 and 63. The Data Compare Strobe arises 180 nanoseconds after the Delay Line Unit Output Strobe to place 1 signals on second inputs to the AND-gates 54 and 63. In addition, the pattern generator 51 output signal is, at this instant, 1 such that only the AND-gate 54 becomes fully enabled. The 1 output signal from the AND-gate 54 enables the OR-gate 65 to set the flip-flop 56. With the flip-flop 56 set, the signal from its 0 terminal is 0, and the Fine Error Indicator Lamp 59 will not be energized by the lamp driver 58, the extinguishing lamp 59 indicating that a "compare" condition was detected during the just completed bit pattern compare test. It may be noted that the 0-bit preceding the 1-bit read from the Delay Line Unit 30 had caused the flip-flop 43 to be in the clear state and hence issuing a 1 signal from its 0 terminal at the same time the pattern generator 51 was issuing a 0 inverted to 1 through the inverter 53. These conditions had enabled the AND-gate 55 and the OR-gate 65 to set the flip-flop 56. Thus, it is evident that the Fine Error Indicator Lamp 59 was extinguished at least as early as the test of the 0-bit preceding the 1-bit depicted in FIGURE 10B.

In the test illustrated under the hypothetically identical jitter conditions illustrated in FIGURES 10A and 10B, it has been demonstrated that a "no compare" condition was detected with the Strobe Selector Switch 13 in the trailing edge/4 position (FIGURE 10A) and a "compare" condition was detected with the Strobe Selector Switch 13 in the trailing edge/1 position (FIGURE 10B). It will be readily evident that the intermediate positions, trailing edge/2 and trailing edge/3, may or may not result in "no compare" conditions being detected according to the influence of transitory jitter conditions experienced, actual as opposed to theoretical waveforms, etc. By running fine adjustment tests of the Delay Line Unit 30 in each of the four trailing edge positions, a definite pattern can be established whereby, for example, errors are detected in the trailing edge/2, 3, 4 positions but not in the trailing edge/1 position.

FIGURE 11 is a timing diagram of the important signals arising during a fine adjustment test and with the Strobe Selector Switch 13 in the leading edge/4 position. The actual signal train read from the Delay Line Unit 30 is displaced, in this instance and because of some jitter condition, slightly later in time from the ideal. The Delay Line Unit Input Strobe trails the Delay Line Unit Output Strobe by 160 nanoseconds and the Data Compare Strobe trails the Delay Line Unit Output Strobe by 180 nanoseconds.

Referring, by way of example, to the 1-bit read from the Delay Line Unit 30, it will be seen that a Delay Line Unit Output Strobe occurs shortly after the 1-bit is impressed on a first input to the AND-gate 40, the coincidence fully enabling the AND-gate 40 to set the flip-flop 43. The 1 signal from the 1 terminal of the flip-flop 43 is impressed on first inputs to the AND-gates 54 and 63, and the Data Compare Strobe is impressed on second inputs to the AND-gates 54 and 63; however, inasmuch as the output from the pattern generator 51 is 1, only the AND-gate 54 will be fully enabled by the Data Compare Strobe. Therefore, the 1 output signal from the AND-gate 54 will enable the OR-gate 65 to set the flip-flop 56. With the flip-flop 56 set, the output signal from its 0 terminal will be 0, and the Fine Error Indicator Lamp 59 will not be energized by the lamp driver 58, the extinguished lamp 59 indicating that a "compare" condition was detected during the just completed bit pattern compare test. It may be observed that the 0-bit preceding the 1-bit read from the Delay Line Unit 30 had caused the flip-flop 43 to be in the clear state and thus issuing a 1 from its 0 terminal while the pattern generator 51 was issuing a 0 inverted to 1 through the inverter 53 to enable the AND-gate 55 and the OR-gate 65 and to set the flip-flop 56. Thus, it is evident that the Fine Error Indicator Lamp 59 was extinguished at least as early as the test of the 0-bit preceding the 1-bit depicted in FIGURE 11.

The leading edge/4 tests illustrated in FIGURE 11 did not result in the detection of "no compare" conditions by a very narrow time margin. It may be assumed in this example that the Delay Line Unit 30 is adjusted to a borderline condition with respect to jitter. Deviations of actual signal waveforms from the rectangular ideal and transitory jitter conditions would therefore be expected to result in the detection of "no compare" conditions to clear the flip-flop 56 and light the Fine Error Indicator Lamp 59 followed by the detection of "compare" conditions to set the flip-flop 56 thereby extinguishing the lamp 59. Thus, if the Automatic Clear/Hold switch 57 is in the automatic clear position, the Fine Error Indicator Lamp 59 may, according to the ratio of "compare" and "no compare" conditions detected, be observed to flicker, appear to be continually off, or appear to be continually on.

Ambiguities flowing from borderline conditions are resolved by running appropriate ones of the fine adjustment tests with the mechanically ganged sections 57A and 57B of the Automatic Clear/Hold switch in the hold position whereby two of the three inputs to the OR-gate 65 are clamped to a 0 logic level. Depressing the "Clear" switch will enable the OR-gate 65 to set the flip-flop 56 in the manner described earlier. However, the first "no compare" condition detected will clear the flip-flop 56 causing the Fine Error Indicator Lamp 59 to be energized. The Fine Error Indicator Lamp 59 remains on inasmuch as the cleared flip-flop 56 cannot be set by subsequently detected "compare" conditions because the circuits between the AND-gates 54 and 55 and the OR-gate 65 are open and the corresponding inputs to the OR-gate 65 are clamped to a 0 logic level as noted above. A single error in a great many bit comparisons will be quickly caught and displayed by the Fine Error Indicator Lamp 59 since the bit comparisons are carried out at a two megacycle rate.

It was assumed for exemplary purposes that the trailing edge tests detected "no compare" conditions in positions 2, 3, and 4 of the Strobe Selector Switch 13 and that the leading edge test detected a "no compare" condition only in position 4. With these observed results, it is apparent that the Delay Line Unit Output Strobe is not optimally placed with respect to the jitter even though a carefully executed coarse adjustment had previously been carried out. Therefore, the Delay Line Unit 30 length must be readjusted so that its functional delay is slightly increased until equivalent leading edge and trailing edge "no compare" conditions are observed in repeated fine adjustment tests. For example, if "no compare" conditions are detected in the trailing edge/3, 4 positions and the leading edge/3, 4 positions but not in the other positions of the Strobe Selector Switch 13, the Delay Line Unit 30 may be considered optimally adjusted with respect to jitter in its instant environment.

It will be observed that no loss of accuracy in making the fine adjustment is experienced should the several increments deviate somewhat from their nominal values because common circuitry is used to develop the time relationship between the Delay Line Unit Input Strobe and the Delay Line Unit Output Strobe. Thus, for example, if the Delay Line Unit Input Strobe trails the Delay Line Unit Output Strobe by an actual 163 nanoseconds rather than the nominal 160 nanoseconds with the Strobe Selector Switch 13 in the leading edge/4 position, the Delay Line Unit Output Strobe will trail the Delay Line Unit Input Strobe by an actual 163 nanoseconds with the Strobe Selector Switch 13 in the trailing edge/4 position.

Further it is readily apparent that there is no need to perform the steps of the fine adjustment tests in any particular order nor is it necessary to effect a coarse adjustment prior to a fine adjustment in those instances in which the Delay Line Unit is known to require only an intrabit check and/or adjustment as, for example, during periodic routine maintenance.

What is claimed is:

1. A method of adjusting the functional length of a delay line unit comprising the steps of: generating a train of clock pulses; sequentially advancing the count in a recycling counter in response to said clock pulses; decoding by first means a first predetermined count as reached by said counter; generating a first test pulse in response to the decoding of said first predetermined count; introducing said first test pulse into said delay line unit on each occasion at which said counter recycles to said first predetermined count; decoding by second means a second predetermined count as reached by said counter; generating a second test pulse in response to the decoding of said second predetermined count; varying the functional length of the delay line unit; observing a range of coincidence between the first test pulse as read from the delay line unit and the second test pulse as generated; and setting the functional length of the delay line unit intermediate within the observed range of coincidence.

2. The method of adjusting the functional length of a delay line unit recited in claim 1 comprising the subsequent steps of: synchronizing first and second regularly advanced pattern generators to a time separation determined by the instant functional length of the delay line unit; strobing the output signal from the first pattern generator into the delay line unit with delay line unit input strobe pulses and from the delay line unit with delay line unit output strobe pulses; incrementally varying the time relationship between the delay line unit input strobe pulses and the delay line unit output strobe pulses to determine a range of coincidence between the delayed signal from the first pattern generator and the signal from the second pattern generator in terms of increments at which coincidence fails at the two extremes of the range of coincidence; and resetting the functional length of the delay line unit such that coincidence fails at equivalent increments at the two extremes of the range of coincidence.

3. The method of adjusting the functional length of a delay line recited in claim 2 in which the range of concidence determined in terms of the increments at which coincidence fails at the two extremes of the range of coincidence: is further determined by the coincidence of a data compare strobe with the delayed signal from the first pattern generator and the signal from the second pattern generator, the generation of the data compare strobe being delayed a predetermined period from the generation of the delay line unit output strobe during each test cycle.

4. Apparatus for effecting the adjustment of the functional length of a delay line unit comprising: a clock pulse generator; a multiple stage, recycling counter, the count in said counter being sequentially advanced by pulses from said clock pulse generator; first decoding means responsive to a first predetermined count in said counter for generating a first test pulse each time the first count is sensed; second decoding means responsive to a second predetermined count in said counter for generating a second test pulse each time the second count is sensed; means for introducing the first test pulse into the delay line unit; and means for testing for coincidence between the first test pulse as read from the delay line unit and the second test pulse.

5. The apparatus of claim 4 which includes: means for perceptibly indicating detected coincidence between the first test pulse as read from the delay line unit and the second test pulse.

6. The apparatus of claim 5 including: first and second pattern generators, each of said first and second pattern generators adapted to be advanced by pulses from said clock pulse generator and further adapted to separately issue identical signal patterns; first strobe generating means for generating delay line unit input strobe pulses; second strobe means for generating delay line unit output strobe pulses; means for incrementally varying the times of issue of the delay line unit input strobe pulses and the delay line unit output strobe pulses relative to one another with reference to the clock pulses; means responsive to the delay line unit input strobe pulses for serially introducing the signal train from said first pattern generator into the delay line unit; means responsive to the delay line unit output strobe pulses for serially reading the first pattern generator signal train from the delay line unit; and data compare means for repetitively testing for failures of coincidence between the delayed signal train from said first pattern generator and the signal train from said second pattern generator.

7. The apparatus of claim 6 including: means responsive to said data compare means for providing a continuous indication of at least one detected failure of coincidence.

8. The apparatus of claim 7 including: third strobe generating means for repetitively generating a data compare strobe pulse a predetermined period after the generation of the delay line unit output strobe following each clock pulse, and means included in said data compare means for repetitively testing for failures of coincidence between the delayed signal train from said first pattern generator, the signal train from said second pattern generator, and the data compare strobe pulses.

9. A method of adjusting the functional length of a delay line unit utilized for temporary storage of binary information optimally with respect to jitter comprising the steps of: synchronizing first and second identically configured, regularly advanced pattern generators to a time separation determined by the instant functional length of the delay line unit; strobing the output signal from the first pattern generator into the delay line unit with delay line unit input strobe pulses and from the delay line unit with delay line unit output strobe pulses; incrementally varying the time relationship between the delay line unit input strobe pulses and the delay line unit output strobe pulses to determine a range of coincidence between the delayed signal from the first pattern generator and the signal from the second pattern generator in terms of the increments at which coincidence fails at the two extremes of the range of coincidence; and resetting the functional length of the delay line unit such that coincidence fails at equivalent increments at the two extremes of the range of coincidence.

10. Apparatus for effecting an optimal delay adjustment with respect to jitter of a delay line unit utilized for the temporary storage of binary information comprising: a clock pulse generator; first and second pattern generators, each of said first and second pattern generators adapted to be advanced by pulses from said clock pulse generator and further adapted to separately issue identical signal patterns; first strobe generating means for regularly generating delay line unit input strobe pulses; second strobe generating means for regularly generating delay line unit output strobe pulses; means for incrementally varying the times of issue of the delay line unit input strobe pulses and the delay line unit output strobe pulses relative to one another with reference to the clock pulses; third strobe generating means for repetitively generating means for repetitively generating a data compare strobe pulse a predetermined period after the generation of the delay line unit output strobe pulse following each clock pulse; means responsive to the delay line unit input strobe pulses for serially introducing the signal train from said first pattern generator into the delay line unit; means responsive to the delay line unit output strobe pulses for reading the first pattern generator signal train from the delay line unit; data compare means responsive to the data compare strobe pulses for testing for failure of coincidence between the delayed signal train from said first pattern generator and the signal train from said second pattern generator; and means responsive to said data compare means for providing a continuous indication of at least one detected failure of coincidence between the delayed signal train from said first pattern generator and the signal train from said second pattern generator.

References Cited

UNITED STATES PATENTS

| 2,866,157 | 12/1958 | Casabona | 324—68 |
| 2,870,402 | 1/1959 | Corr et al. | 324—57 |
| 2,939,075 | 5/1960 | Schwab | 324—57 |
| 3,229,203 | 1/1966 | Minohara | 324—83 |
| 3,249,867 | 5/1966 | Hattersley et al. | 324—68 |
| 3,354,297 | 11/1967 | Anderson et al. | 235—181 |

EDWARD E. KUBASIEWICZ, Primary Examiner

U.S. Cl. X.R.

235—181; 333—18; 324—68, 83; 328—55